United States Patent
Lin et al.

(10) Patent No.: US 10,021,367 B2
(45) Date of Patent: Jul. 10, 2018

(54) METHOD AND APPARATUS OF INTER-VIEW CANDIDATE DERIVATION FOR THREE-DIMENSIONAL VIDEO CODING

(71) Applicant: HFI Innovation Inc., Zhubei, Hsinchu County (TW)

(72) Inventors: Jian-Liang Lin, Su'ao Township, Yilan County (TW); Yi-Wen Chen, Taichung (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 144 days.

(21) Appl. No.: 14/762,881

(22) PCT Filed: Mar. 20, 2014

(86) PCT No.: PCT/CN2014/073786
§ 371 (c)(1),
(2) Date: Jul. 23, 2015

(87) PCT Pub. No.: WO2014/166329
PCT Pub. Date: Oct. 16, 2014

(65) Prior Publication Data
US 2015/0358600 A1 Dec. 10, 2015

Related U.S. Application Data

(60) Provisional application No. 61/810,383, filed on Apr. 10, 2013.

(51) Int. Cl.
*H04N 19/597* (2014.01)
*H04N 19/96* (2014.01)
(Continued)

(52) U.S. Cl.
CPC ....... *H04N 13/0048* (2013.01); *H04N 19/176* (2014.11); *H04N 19/51* (2014.11);
(Continued)

(58) Field of Classification Search
None
See application file for complete search history.

(56) References Cited

U.S. PATENT DOCUMENTS

| | | | |
|---|---|---|---|
| 9,621,920 B2* | 4/2017 | An | H04N 19/597 |
| 2012/0314027 A1* | 12/2012 | Tian | H04N 7/181 |
| | | | 348/43 |

(Continued)

FOREIGN PATENT DOCUMENTS

| | | |
|---|---|---|
| CN | 101222627 | 7/2008 |
| CN | 102946536 | 2/2013 |

(Continued)

OTHER PUBLICATIONS

Gerhard et al., "3D-HEVC Test Model, JCT3V-A1005-d0, Jul. 16-20, 2012".*

(Continued)

*Primary Examiner* — Mohammad J Rahman
(74) *Attorney, Agent, or Firm* — McClure, Qualey & Rodack, LLP

(57) ABSTRACT

A method and apparatus of three-dimensional/multi-view coding using a candidate list including a second inter-view candidate in the candidate list for Merge mode, Skip mode or AMVP based (Advanced Motion Vector Prediction based) Inter mode are disclosed. The second inter-view candidate can be derived based on already coded or decoded texture data for the candidate list to include. For example, the second inter-view candidate can be determined from the motion information associated with a corresponding block in a reference view, where the corresponding block is located (Continued)

according to the location of the right-bottom neighboring block and a selected disparity vector. The right-bottom neighboring block is located across from a right-bottom corner of the current texture block. The second inter-view candidate can be inserted into the candidate list only when the number of previous available candidates is smaller than a pre-specified number.

18 Claims, 3 Drawing Sheets

(51) Int. Cl.
    *H04N 19/176*    (2014.01)
    *H04N 19/51*     (2014.01)
    *H04N 13/00*     (2018.01)
    *H04N 19/61*     (2014.01)

(52) U.S. Cl.
    CPC ........... *H04N 19/597* (2014.11); *H04N 19/61* (2014.11); *H04N 19/96* (2014.11)

(56) References Cited

U.S. PATENT DOCUMENTS

| | | | |
|---|---|---|---|
| 2013/0176390 A1* | 7/2013 | Chen | H04N 19/597 348/43 |
| 2013/0229485 A1* | 9/2013 | Rusanovskyy | H04N 13/0048 348/43 |
| 2013/0242046 A1* | 9/2013 | Zhang | H04N 13/0048 348/43 |
| 2013/0265388 A1* | 10/2013 | Zhang | H04N 13/0048 348/43 |
| 2013/0335522 A1* | 12/2013 | Zhang | H04N 19/597 348/43 |
| 2014/0092968 A1* | 4/2014 | Guillemot | H04N 19/597 375/240.14 |
| 2014/0098878 A1* | 4/2014 | Guillemot | H04N 19/597 375/240.16 |
| 2015/0043635 A1* | 2/2015 | Jung | H04N 19/44 375/240.12 |
| 2015/0085932 A1* | 3/2015 | Lin | H04N 19/597 375/240.16 |
| 2015/0215640 A1* | 7/2015 | Lin | H04N 19/597 375/240.16 |
| 2015/0245063 A1* | 8/2015 | Rusanovskyy | H04N 19/597 375/240.12 |
| 2015/0382011 A1* | 12/2015 | Lin | H04N 19/597 375/240.16 |
| 2016/0295230 A1 | 10/2016 | Takahashi et al. | |
| 2017/0041631 A1 | 2/2017 | Takahashi et al. | |

FOREIGN PATENT DOCUMENTS

| | | |
|---|---|---|
| JP | WO2013002342 A1 | 2/2015 |
| WO | WO 2012/171442 | 12/2012 |
| WO | WO 2013/002342 | 1/2013 |

OTHER PUBLICATIONS

Zhang, L., et al.; "3D-CE5.h: Merge candidates derivation from disparity vector shifting;" Joint Collaborative Team on 3D Video Coding Extension Development of ITU-T SG 16 WP 3 and ISO/IEC JTC 1/SC 29/WG 11; Jan. 2013; pp. 1-5.

Guillemot, C., et al.; "3D-CE5.h: Additional merge candidates derived from shifted disparity candidate predictors;" Joint Collaborative Team on 3D Video Coding Extension Development of ITU-T SG 16 WP 3 and ISO/IEC JTC 1/SC 29/WG 11; Jan. 2013; pp. 1-6.

Sung, J., et al.; "3D-CE2.h related: Motion Aware Temporal disparity Vector Derivation;" Joint Collaborative Team on 3D Video Coding Extension Development of ITU-T SG 16 WP 3 and ISO/IEC JTC 1/SC 29/WG 11; Jan. 2013; pp. 1-9.

Lin, J.L, et al.; "3D-CE5.h related Additional inter-view merging candidate;" Joint Collaborative Team on 3 Video Coding Extensions of ITU-TSG 16 WP 3 and ISO/IEC JTC 1/SC 291WG 11; Apr. 2013; pp. 1-4.

Zhang, K., et al.; "3D-CE5.h related Improvement on MV candidates for 3DVC;" Joint Collaborative Team on 3 Video coding Extensions of ITU-TSG 16 WP 3 and ISO/IEC JTC 1/SC 29/WG 11; Oct. 2012; pp. 1-12.

\* cited by examiner

METHOD AND APPARATUS OF INTER-VIEW CANDIDATE DERIVATION FOR THREE-DIMENSIONAL VIDEO CODING

CROSS REFERENCE TO RELATED APPLICATIONS

The present invention is a National Phase Application of PCT Application No. PCT/CN2014/073786, filed on Mar. 20, 2014, which claims priority to U.S. Provisional Patent Application, Ser. No. 61/810,383, filed on Apr. 10, 2013, entitled "Additional Inter-view Candidate for 3D and Multi-view Video Coding". The priority applications are hereby incorporated by reference in their entireties.

FIELD OF INVENTION

The present invention relates to video coding. In particular, the present invention relates to interview candidate derivation for motion vector/disparity vector or motion vector prediction/disparity vector prediction in three-dimensional/multi-view video coding.

BACKGROUND OF THE INVENTION

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance. In order to improve multi-view video coding efficiency, multi-view video coding always exploits inter-view redundancy. The disparity between two views is caused by the locations and angles of the two respective cameras.

To reduce the inter-view redundancy, disparity-compensated prediction (DCP) has been used as an alternative to motion-compensated prediction (MCP). MCP refers to an inter-picture prediction that uses already coded pictures of the same view in a different access unit, while DCP refers to inter-picture prediction that uses already coded pictures of other views in the same access unit, as illustrated in FIG. 1. The three-dimensional/multi-view data consists of texture pictures (110) and depth maps (120). The motion compensated prediction is applied to texture pictures or depth maps in the temporal direction (i.e., the horizontal direction in FIG. 1). The disparity compensated prediction is applied to texture pictures or depth maps in the view direction (i.e., the vertical direction in FIG. 1). The vector used for DCP is termed disparity vector (DV), which is analog to the motion vector (MV) used in MCP.

3D-HEVC is an extension of HEVC (High Efficiency Video Coding) that is being developed for encoding/decoding 3D video. One of the views is referred to as the base view or the independent view. The base view is coded independently of the other views as well as the depth data. Furthermore, the base view is coded using a conventional HEVC video coder.

In 3D-HEVC, a hybrid block-based motion-compensated DCT-like transform coding architecture is still utilized. The basic unit for compression, termed coding unit (CU), is a 2N×2N square block, and each CU can be recursively split into four smaller CUs until the predefined minimum size is reached. Each CU contains one or multiple prediction units (PUs). The PU size can be 2N×2N, 2N×N, N×2N, or N×N. When asymmetric motion partition (AMP) is supported, the PU size can also be 2N×nU, 2N×nD, nL×2N and nR×2N.

In 3D-HEVC, a motion vector competition (MVC) based scheme is also applied to select a motion vector predictor/disparity vector predictor (MVP/DVP) among a given candidate set (or candidate list). There are three inter-prediction modes including Inter, Skip, and Merge. The Inter mode performs motion-compensated prediction/disparity-compensated prediction with transmitted motion vectors/disparity vectors (MVs/DVs), while the Skip and Merge modes utilize inference methods to select a MV or DV from a candidate list to obtain the motion information. The candidate list comprises candidates from spatial neighboring blocks located in the current picture, a temporal neighboring block located in a temporal collocated picture which is signaled in the slice header, or the corresponding block in an inter-view reference picture. These candidates are arranged in the candidate list according to a competition order, one candidate in the list is selected as MV/DV or MVP/DVP. When a PU is coded in Skip or Merge mode, no motion information is transmitted except for the index of the selected candidate. In the case of a PU coded in the Skip mode, the residual signal is also omitted.

For the Inter mode in HTM-4.0 (3D-HEVC based Test Model version 4.0), the Advanced Motion Vector Prediction (AMVP) scheme is used to select a motion vector predictor among an AMVP candidate set. As for the Merge and Skip modes, the Merge scheme is used to select a motion vector predictor among a Merge candidate set. Based on the rate-distortion optimization (RDO) decision, the encoder selects one final MVP/DVP within a given candidate set of MVPs/DVPs for Inter, Skip, or Merge modes and transmits the index of the selected MVP/DVP to the decoder. The selected MVP/DVP may be linearly scaled according to temporal distances or view distances.

For the Inter mode of depth coding, the reference picture index is explicitly transmitted to the decoder. The MVP/DVP is then selected among the candidate set for a given reference picture index. As shown in FIG. 2, the MVP/DVP candidate set for the Inter mode in HTM-4.0 includes two spatial MVPs/DVPs, an inter-view candidate, and a temporal MVP/DVP. One spatial MVP/DVP candidate is selected from B0, B1 and B2 and the other spatial MVP/DVP candidate is selected from A0 and A1. The temporal MVP/DVP candidate is selected from TBR. If TBR is not available, TCT is used. The temporal blocks TBR and TCT are located in a temporal reference picture. The size of MVP/DVP candidate set is fixed to 2 or 3 depending on whether the inter-view candidate is included.

In 3D-HEVC, if a particular block is encoded using a Merge mode, a Merge index is signaled to indicate which MVP/DVP candidate among the Merge candidate set is used for this block to be merged. To follow the essence of motion information sharing, each merged PU reuses the MV, prediction direction, and reference picture index of the selected candidate. For the temporal merging candidate, the reference picture index is set to zero and the MV is scaled according to the POC distances. As shown in FIG. 2, the Merge candidate set includes five spatial merging candidates, one inter-view candidate, one disparity candidate, one VSP candidate, and one temporal merging candidate. The size of Merge candidate set is fixed to 6. The temporal candidate is based on the bottom-right block (TBR) of the temporally collocated block. If the bottom-right block (TBR) is not available, the center block (TCT) of the temporally collocated block is used. The candidate set for texture coding in 3D-HEVC is shown as the following:

Inter-view candidate
A1
B1
B0
A0
Disparity candidate (DV)
B2
VSP candidate
Temporal candidate.

The candidates are inserted into the candidate list one by one according to the competition order shown above (i.e., from Inter-view candidate to temporal candidate). When the total number of candidates in the merging candidate list reaches 6 (with redundant candidates removed), no additional candidate will be inserted.

For Merge mode and Skip mode, if the candidate list can result in a better MV/DV or MVP/DVP, more blocks may be coded in the merge mode or Skip mode. Accordingly, the coding efficiency may be improved. Therefore, it is desired to develop a merging candidate list that can improve the coding efficiency.

SUMMARY OF THE INVENTION

A method and apparatus of three-dimensional/multi-view coding using a candidate list including a second inter-view candidate in the candidate list for Merge mode, Skip mode or AMVP based (Advanced Motion Vector Prediction based) Inter mode are disclosed. Embodiments according to the present invention derives a second inter-view candidate based on said already coded or decoded texture data for the candidate list to include and encodes/decodes the motion information of the current texture block using the candidate list. The second inter-view candidate is determined from the motion information associated with a corresponding block in a reference view, where the corresponding block may be located according to the location of the right-bottom neighboring block and a selected disparity vector. The right-bottom neighboring block is located across from a right-bottom corner of the current texture block.

One aspect of the invention addresses the derivation of the selected disparity vector. In one embodiment, the selected disparity vector can be the same disparity vector used to derive the first inter-view candidate. When the candidate list comprises a disparity candidate, the selected disparity vector can be the same as the disparity candidate. The selected disparity vector can also be derived from one or more depth samples of an already coded depth block associated with the current texture block. The selected disparity vector can be derived from a global disparity vector. When the candidate list comprises a temporal candidate, the second inter-view candidate can be inserted into the candidate list before the temporal candidate according to a competition order.

The second inter-view candidate can be inserted into the candidate list conditionally. For example, the second inter-view candidate is inserted into the candidate list only when the number of previous available candidates is smaller than a pre-specified number. Alternatively, the second inter-view candidate is inserted into the candidate list only when the first inter-view candidate is not available. To simplify candidate list formation, the second inter-view candidate can be compared to the first inter-view candidate only for redundancy checking. In one embodiment, the first inter-view candidate is always placed at the first position of the candidate list according to a competition order. If the first inter-view candidate is not available, it is replaced by the second inter-view candidate. If the second inter-view candidate is also not available, a default value is used. When the second inter-view candidate is inserted into the candidate list, total number of candidates in the candidate list is increased by 1.

In one embodiment, when the second inter-view candidate is selected from the candidate list, inter-view residual prediction is not applied to the current texture block. In another embodiment, when the second inter-view candidate is selected from the candidate list, inter-view residual prediction is applied to the current texture block. In yet another embodiment, when the second inter-view candidate is selected from the candidate list, inter-view residual prediction is applied to the current texture block selectively based on system configuration or a flag. The second inter-view candidate can be derived according to a disparity vector and the disparity vector can be used to derive a second disparity vector for a subsequent block of the current texture block.

DETAILED DESCRIPTION

Figure 1:
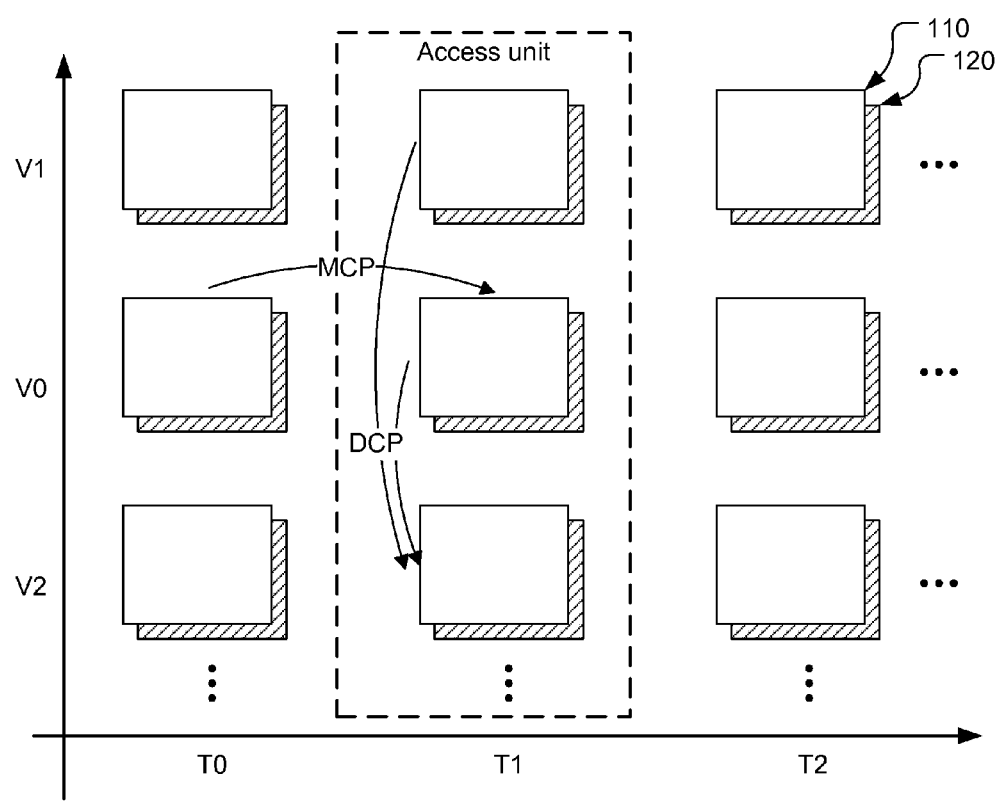
FIG. 1 illustrates an example of three-dimensional/multi-view coding, where motion compensated prediction (MCP) and disparity compensated prediction (DCP) are used.
Figure 2:
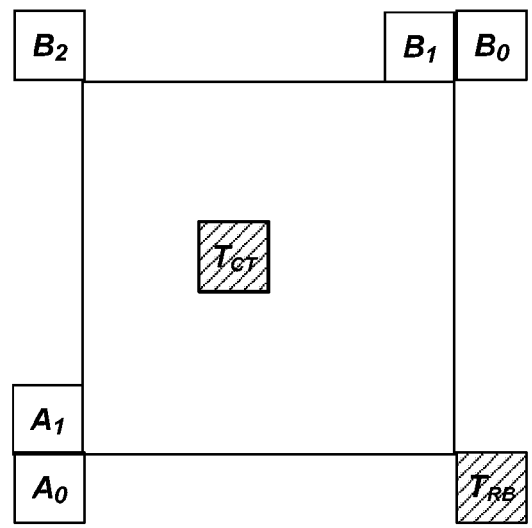
FIG. 2 illustrates the spatial and temporal neighboring block configuration used to derive candidate list for Merge/Skip/Inter modes according to High Efficiency Video Coding standard.
Figure 3:
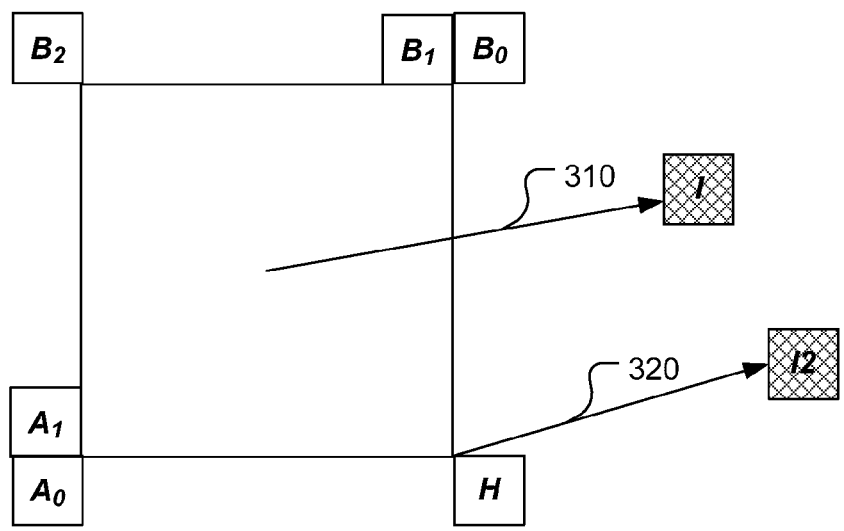
FIG. 3 illustrates an example of merging candidate list incorporating an embodiment of the present invention, where two inter-view candidates are included in the merging candidate list.

In the present invention, an additional inter-view candidate is incorporated into the merging candidate list to improve the coding efficiency for a three-dimensional/multi-view coding system. An exemplary additional inter-view candidate (320) is derived from a corresponding block in a reference view, where the corresponding block is located according to the location of a right-bottom neighboring block (block H position) shifted by a selected disparity vector as shown in FIG. 3. The right-bottom neighboring block is located across from a right-bottom corner of the current texture block. The selected disparity vector may be the same as the one used in the derivation of the first inter-view candidate (310) or the same as the disparity candidate in the merging candidate list.

The selected disparity vector can also be the disparity vector used in the derivation of the first inter-view candidate or the disparity candidate plus an offset value. The offset value can be added in the horizontal, vertical, or both horizontal and vertical direction.

The selected disparity vector can also be determined from the disparity vector of the neighboring spatial block or temporal block. Moreover, the selected disparity vector can also be derived from the associated depth block. The selected disparity vector can also be derived from a global disparity vector.

The additional inter-view candidate can also be derived from a corresponding block in a reference view which is located by another position (e.g., block A0, A1, B0, B1, or B2) shifted by a selected disparity vector.

The additional inter-view candidate may be inserted into the merging candidate list in any possible position. For example, the merging candidate list can be as follows in the competition order (i.e., the first one corresponding to the highest priority order):

Merging candidate list for texture coding (size=6)
Inter-view candidate 1
A1
B1
B0
Disparity candidate (when N'<=4)
A0
B2 (only when N'<=4)
VSP candidate (only when N'<=4)
Inter-view candidate 2 (when N'<=4)
Temporal candidate (when N'<=5), where N' is an integer representing the number of available candidates up to the moment of inserting a current candidate.

In the above example, the size of the merging candidate list is 6 and the additional inter-view candidate (i.e., the second inter-view candidate) is inserted before the temporal candidate (in the competition order). In one embodiment, the additional inter-view candidate according to the present invention can only be added under some given conditions. In the above example, the additional inter-view candidate is added only when the number of previous available candidates is 4 or less. In other words, the additional inter-view candidate can be inserted into the candidate list only when the number of previous available candidates is smaller than a pre-specified number.

In the pruning process, the additional inter-view candidate can be compared to all the previous candidates to remove the redundancy. For simplification, the additional inter-view candidate is only compared to the first inter-view candidate and the additional inter-view candidate will not be added in the merging candidate list if it is the same as the first inter-view candidate.

In another embodiment, the additional inter-view candidate may be added into the merging candidate list only when the first inter-view candidate is not available.

In yet another embodiment of the present invention, the inter-view candidate always corresponds to the candidate with a fixed candidate index. For example, in the case of candidate index=0, the inter-view candidate will be always in the first position in the candidate list for Inter, Merge, or Skip mode. When the inter-view candidate corresponds to candidate index=0 and the first inter-view candidate is not available, the inter-view candidate will be replaced by the additional inter-view candidate (i.e., the second inter-view candidate). If the additional inter-view candidate is not available either, the inter-view candidate is replaced by a default candidate such as zero MVP.

The additional inter-view candidate as mentioned above can also be added into the AMVP candidate list.

When the additional inter-view candidate according to the present invention is included in the merging candidate list or AMVP candidate list, the size of the candidate list can be increased by one. For example, in HTM-6.0, the size of merging candidate list for coding a dependent view is 6 and the size is increased to 7 when the additional inter-view candidate is included in the candidate list.

If a three-dimensional/multi-view coding system has complexity constraint or prefers to have reduced the complexity, the additional inter-view candidate is not applied to the inter-view residual prediction when the additional inter-view candidate according to the present invention is chosen from the candidate list as MV/DV or MVP/DVP.

On the other hand, if a three-dimensional/multi-view coding system prefers to have improved coding gain, the additional inter-view candidate is applied to inter-view residual prediction when the additional inter-view candidate according to the present invention is chosen from the candidate list as MV/DV or MVP/DVP.

Alternatively, when the additional inter-view candidate according to the present invention is chosen from the candidate list as MV/DV or MVP/DVP, the additional inter-view candidate is selectively applied to the inter-view residual prediction. The selection can be based on system configuration such as preference of low complexity or high performance. The selection may also be indicated by a flag.

The selected DV used to derive the additional inter-view candidate can also be used for DV derivation for the following CUs/PUs.

The performance of a 3D/multi-view video coding system incorporating an embodiment of the present invention with an additional inter-view candidate is compared with the performance of a conventional system based on HTM-6.0 as shown in Table 1. The performance comparison is based on different sets of test data listed in the first column. The BD-rate differences are shown for texture pictures in view 1 (video 1) and view 2 (video 2). A negative value in the BD-rate implies that the present invention has a better performance. As shown in Table 1, the BD-rates for video 1 and video 2 incorporating an embodiment of the present invention are reduced by 0.2% and 0.1% respectively. The second group of performance is the BD-rate differences for texture video only (video PSNR/video bitrate), the BD-rate difference for the texture PSNR versus the total bitrate (texture bitrate and depth bitrate) for texture video (video PSNR/total bitrate), and the averaged PSNR of six synthesized view versus the total bitrate (synth. PSNR/total bitrate). As shown in Table 1, the average performance in this group also shows slight improvement (0.1%) over the conventional HTM-6.0. The processing times (encoding time, decoding time and rendering time) are also compared. As shown in Table 1, the encoding time, decoding time and rendering time are about the same.

TABLE 1

| | video 0 | video 1 | video 2 | video PSNR/ video bitrate | video PSNR/ total bitrate | synth PSNR/ total bitrate | enc time | dec time | ren time |
|---|---|---|---|---|---|---|---|---|---|
| Balloons | 0.0% | −0.2% | −0.3% | −0.1% | −0.1% | −0.2% | 98.3% | 102.7% | 94.7% |
| Kendo | 0.0% | −0.1% | −0.2% | −0.1% | −0.1% | −0.2% | 98.5% | 100.0% | 99.2% |
| Newspaper_CC | 0.0% | −0.2% | 0.0% | 0.0% | 0.0% | 0.0% | 98.7% | 100.6% | 100.9% |
| GT_Fly | 0.0% | 0.1% | 0.0% | 0.0% | 0.0% | 0.0% | 99.1% | 101.6% | 98.7% |
| Poznan_Hall2 | 0.0% | −0.6% | −0.1% | −0.2% | −0.2% | −0.1% | 100.3% | 99.3% | 102.2% |
| Poznan_Street | 0.0% | 0.0% | 0.1% | 0.0% | 0.0% | 0.0% | 99.2% | 99.7% | 96.9% |
| Undo_Dancer | 0.0% | −0.1% | −0.2% | −0.1% | −0.1% | −0.2% | 99.3% | 101.4% | 98.8% |
| 1024 × 768 | 0.0% | −0.2% | −0.2% | −0.1% | −0.1% | −0.1% | 98.5% | 101.1% | 98.3% |
| 1920 × 1088 | 0.0% | −0.1% | 0.0% | −0.1% | −0.1% | −0.1% | 99.5% | 100.5% | 99.1% |
| average | 0.0% | −0.2% | −0.1% | −0.1% | −0.1% | −0.1% | 99.1% | 100.8% | 98.8% |

Figure 4:
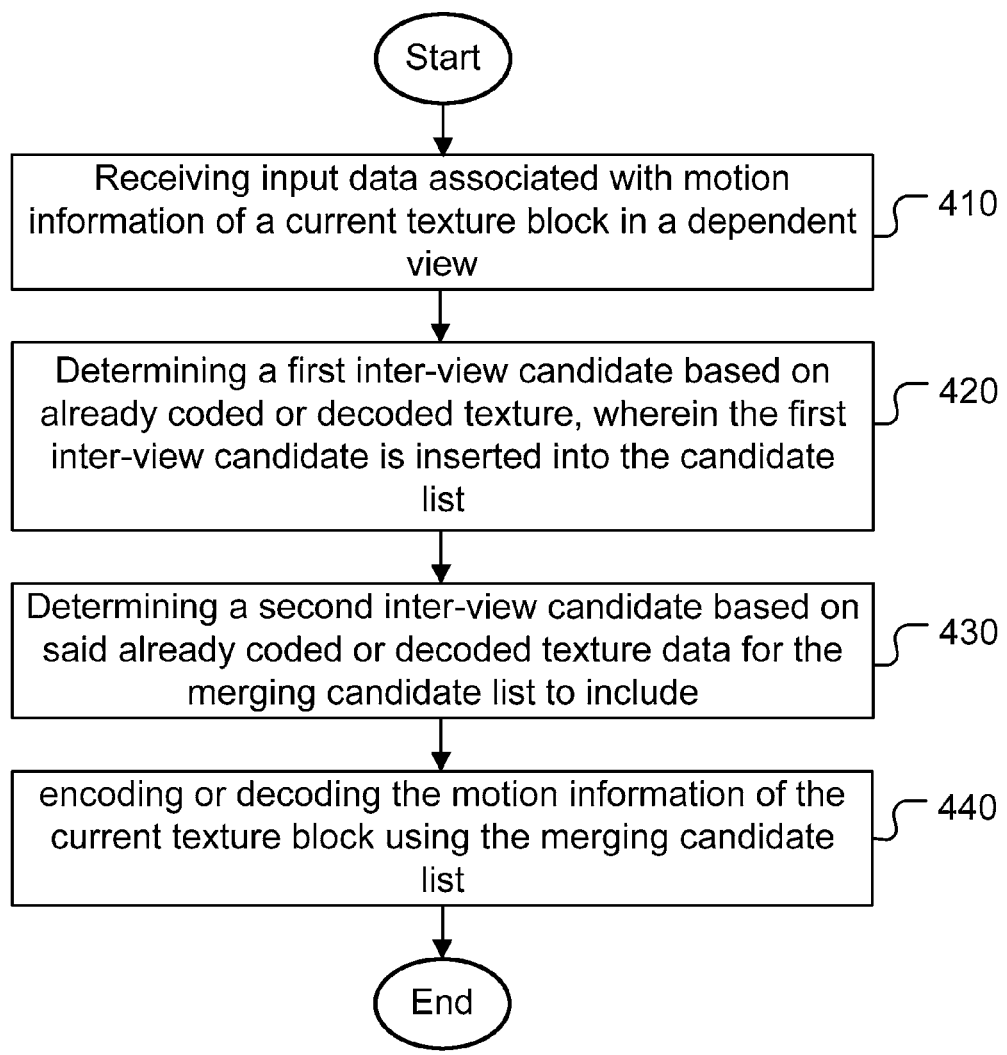
FIG. 4 illustrates an exemplary flowchart for deriving a candidate list for Merge mode, Skip mode or AMVP-based Inter mode in three-dimensional and multi-view coding systems incorporating an embodiment of the present invention.

FIG. 4 illustrates an exemplary flowchart of a three-dimensional/multi-view coding system incorporating a candidate list with a second inter-view candidate according to an embodiment of the present invention. The system receives input data associated with motion information of a current texture block in a dependent view as shown in step 410. For encoding, the input data associated with motion information of the current texture block corresponds to the motion information to be coded. For decoding, the input data associated with motion information of the current texture block corresponds to the coded motion information to be decoded. The motion information of the current texture block may be retrieved from memory (e.g., computer memory, buffer (RAM or DRAM) or other media) or from a processor. A first inter-view candidate is determined based on already coded or decoded texture data as shown in step 420, wherein the first inter-view candidate is inserted into the merging candidate list. A second inter-view candidate is determined based on said already coded or decoded texture data for the candidate list to include as shown in step 430. The motion information of the current texture block is then encoded or decoded using the candidate list as shown in step 440.

The flowchart shown above is intended to illustrate an example of 3D/multi-view coding using a candidate list with a second inter-view candidate. A person skilled in the art may modify each step, re-arranges the steps, split a step, or combine steps to practice the present invention without departing from the spirit of the present invention The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of deriving a candidate list for Merge mode, Skip mode or Inter mode in a three-dimensional (3D) or multi-view coding system, the method comprising:
    receiving input data associated with motion information of a current texture block in a dependent view;
    determining a first inter-view candidate based on already coded or decoded texture data, wherein the first inter-view candidate is inserted into the candidate list;
    determining a second inter-view candidate based on said already coded or decoded texture data for the candidate list to include; and
    encoding or decoding the motion information of the current texture block using the candidate list,
    wherein the second inter-view candidate is determined from the motion information associated with a corresponding block in a reference view, wherein a location of the corresponding block is derived from a location of a neighboring block shifted by a selected disparity vector.

2. The method of claim 1, wherein the corresponding block is located according to a first location of a right-bottom neighboring block and the selected disparity vector, and wherein the right-bottom neighboring block is located across from a right-bottom corner of the current texture block.

3. The method of claim 2, wherein the selected disparity vector is a same disparity vector used to derive the first inter-view candidate.

4. The method of claim 2, wherein the selected disparity vector is derived based on a second disparity vector and an offset value, wherein the second disparity vector is used to derive the first inter-view candidate.

5. The method of claim 2, wherein the candidate list comprises a disparity candidate, and wherein the selected disparity vector is the same as the disparity candidate.

6. The method of claim 2, wherein the selected disparity vector is derived from one or more depth samples of an already coded depth block associated with the current texture block.

7. The method of claim 2, wherein the selected disparity vector is derived from a global disparity vector.

8. The method of claim 1, wherein the candidate list comprises a temporal candidate, and the second inter-view candidate is inserted into the candidate list before the temporal candidate according to a pre-determined order.

9. The method of claim 1, wherein the second inter-view candidate is inserted into the candidate list only when a number of previous available candidates is smaller than a pre-specified number.

10. The method of claim 1, wherein the second inter-view candidate is inserted into the candidate list only when the first inter-view candidate is not available.

11. The method of claim 1, wherein the second inter-view candidate is only compared to the first inter-view candidate to determine whether the first inter-view candidate and the second inter-view candidate are redundant.

12. The method of claim 1, wherein the first inter-view candidate is always placed at a first position of the candidate list according to a pre-determined order, wherein the first inter-view candidate is replaced by the second inter-view candidate if the first inter-view candidate is not available, and the first inter-view candidate is replaced by a default candidate if the second inter-view candidate is also not available.

13. The method of claim 1, wherein total number of candidates in the candidate list is increased by 1 when the second inter-view candidate is inserted into the candidate list.

14. The method of claim 1, wherein inter-view residual prediction is not applied to the current texture block when the second inter-view candidate is selected from the candidate list.

15. The method of claim 1, wherein inter-view residual prediction is applied to the current texture block according to the second inter-view candidate when the second inter-view candidate is selected from the candidate list.

16. The method of claim 1, wherein inter-view residual prediction is applied to the current texture block selectively based on system configuration or a flag when the second inter-view candidate is selected from the candidate list.

17. The method of claim 1, wherein the second inter-view candidate is derived according to a disparity vector and the disparity vector is used to derive a second disparity vector for a subsequent block of the current texture block.

18. An apparatus for deriving a candidate list for Merge mode, Skip mode or Inter mode in a three-dimensional (3D) or multi-view coding system, the apparatus comprising one or more electronic circuits, wherein said one or more electronic circuits are configured to:
receive input data associated with motion information of a current texture block in a dependent view;
determine a first inter-view candidate based on already coded or decoded texture data, wherein the first inter-view candidate is inserted into the candidate list;
determine a second inter-view candidate based on said already coded or decoded texture data for the candidate list to include; and
encode or decode the motion information of the current texture block using the candidate list,
wherein the second inter-view candidate is determined from the motion information associated with a corresponding block in a reference view, wherein a location of the corresponding block is derived from a location of a neighboring block shifted by a selected disparity vector.

* * * * *